(12) United States Patent  
Hively et al.

(10) Patent No.: US 9,227,616 B2  
(45) Date of Patent: Jan. 5, 2016

(54) BLOCKING DEVICE FOR SPRING BRAKE

(71) Applicant: International Truck Intellectual Property Company, LLC, Lisle, IL (US)

(72) Inventors: Terry E. Hively, Fort Wayne, IN (US); Jeff G. Kohler, Lisle, IL (US); Michael R. Krueger, Gilberts, IL (US); Allen D. Sprunger, Berne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 428 days.

(21) Appl. No.: 13/902,271

(22) Filed: May 24, 2013

(65) Prior Publication Data

US 2014/0345995 A1 Nov. 27, 2014

(51) Int. Cl.  
*F16D 121/10* (2012.01)  
*B60T 17/22* (2006.01)  
*B60T 17/08* (2006.01)

(52) U.S. Cl.  
CPC ............. *B60T 17/221* (2013.01); *B60T 17/088* (2013.01)

(58) Field of Classification Search  
CPC ..... B60T 17/18; B60T 17/083; B60T 17/086; F16D 2121/10  
See application file for complete search history.

(56) References Cited

U.S. PATENT DOCUMENTS

| | | | | |
|---|---|---|---|---|
| 3,508,470 A | * | 4/1970 | Wearden | B60T 17/086 92/128 |
| 3,563,139 A | * | 2/1971 | Page | B60T 17/086 92/130 A |
| 3,696,711 A | * | 10/1972 | Berg | B60T 17/083 188/170 |
| 3,774,507 A | * | 11/1973 | Page | B60T 17/085 92/130 A |
| 3,796,138 A | * | 3/1974 | Doyle | B60T 17/086 188/170 |

(Continued)

*Primary Examiner* — Thomas Irvin  
(74) *Attorney, Agent, or Firm* — Jeffrey P. Calfa; Mark C. Bach

(57) ABSTRACT

A blocking device for attaching to an entry aperture structure of a spring brake cylinder of a vehicle includes a blocking fastener having a head and a shaft extending from the head. The head has a plurality of cylindrical recesses that extend generally parallel to the shaft. At least a portion of the shaft is threaded. A fastener receiver has an insertion portion and a base extending generally transversely to the insertion portion. The insertion portion has an interior surface that is threaded and is configured to receive the shaft of the blocking fastener. The base has a first tier that extends generally radially from the insertion portion and has a diameter that corresponds to the diameter of the entry aperture structure such that the base engages the entry aperture structure radially. A fastener receiving component is disposed on the shaft.

15 Claims, 6 Drawing Sheets

(56) References Cited

U.S. PATENT DOCUMENTS

| | | | | |
|---|---|---|---|---|
| 3,880,477 A * | 4/1975 | Stevenson | B60R 25/09 | 303/89 |
| 3,908,520 A * | 9/1975 | Ma | B60T 17/086 | 92/63 |
| 4,080,875 A * | 3/1978 | Repolovsky | B60T 17/086 | 92/129 |
| 5,460,076 A * | 10/1995 | Pierce | B60T 17/083 | 137/517 |
| 5,632,192 A * | 5/1997 | Plantan | B60T 17/086 | 92/15 |
| 5,640,893 A * | 6/1997 | Stojic | B60T 17/086 | 92/130 A |
| 5,655,431 A * | 8/1997 | Pierce | B60T 17/083 | 411/361 |
| 5,725,076 A * | 3/1998 | Pierce | B60T 17/086 | 188/170 |
| 5,771,774 A * | 6/1998 | Stojic | B60T 17/083 | 29/888.06 |
| 5,799,564 A * | 9/1998 | Pierce | B60T 17/083 | 92/129 |
| 6,006,651 A * | 12/1999 | Pierce | B01D 46/10 | 92/130 A |
| 6,012,378 A * | 1/2000 | Hicks | B60T 17/083 | 92/6 D |
| 6,029,447 A * | 2/2000 | Stojic | B60T 17/085 | 60/453 |
| 6,588,314 B1 * | 7/2003 | Stojic | B60T 17/083 | 92/63 |
| 8,978,839 B2 * | 3/2015 | Bradford | B60T 17/083 | 188/106 F |
| 2012/0255818 A1 * | 10/2012 | Shimomura | B60T 17/083 | 188/170 |
| 2013/0075206 A1 * | 3/2013 | Plantan | F16D 65/28 | 188/170 |
| 2013/0239799 A1 * | 9/2013 | Bradford | B60T 17/086 | 92/63 |
| 2014/0096678 A1 * | 4/2014 | Shimomura | B60T 11/00 | 92/96 |
| 2014/0305300 A1 * | 10/2014 | Park | B60T 17/086 | 92/63 |
| 2015/0246667 A1 * | 9/2015 | Shimomura | F16D 65/28 | 188/166 |

* cited by examiner

BLOCKING DEVICE FOR SPRING BRAKE

BACKGROUND

Embodiments described herein relate generally to a blocking device, and more particularly, to a blocking device for blocking the insertion of a caging bolt into an entry aperture of a spring brake.

In trucks, buses and other vehicles, a spring brake may be located on the rear axle of the vehicle, and may be used as the parking brake. Spring brakes use air pressure and a spring to apply braking power. When driving, air pressure is applied, the spring is compressed, and the parking brake is disengaged. When the spring is decompressed due to low air pressure, the parking brake is applied. If there is loss of air pressure, the spring may be strong enough to apply braking power to the axle.

If there is no air pressure to disengage the parking brake, and if the vehicle needs to be moved, the spring can be mechanically released using a caging bolt. The caging bolt is inserted into an entry aperture of the spring brake cylinder, where the bolt is locked into place inside the spring parking brake chamber. The bolt is turned until the spring is released. However, an unauthorized user may mechanically release the parking brake when the authorized user has the parking brake engaged.

SUMMARY

A blocking device for attaching to an entry aperture structure of a spring brake cylinder of a vehicle includes a blocking fastener having a head and a shaft extending from the head. The head has a plurality of cylindrical recesses that extend generally parallel to the shaft. At least a portion of the shaft is threaded. A fastener receiver has an insertion portion and a base extending generally transversely to the insertion portion. The insertion portion has an interior surface that is threaded and is configured to receive the shaft of the blocking fastener. The base has a first tier that extends generally radially from the insertion portion and has a diameter that corresponds to the diameter of the entry aperture structure such that the base engages the entry aperture structure radially. A fastener receiving component is disposed on the shaft.

A blocking system for blocking an aperture of a vehicle component includes a blocking device and a release tool. The blocking device includes a blocking fastener having a head and a shaft extending from the head. The head has a plurality of cylindrical recesses that extend generally parallel to the shaft. At least a portion of the shaft is threaded. A fastener receiver has an insertion portion and a base extending generally transversely to the insertion portion. The insertion portion has an interior surface that is threaded and is configured to receive the shaft of the blocking fastener. The base has a first tier that extends generally radially from the insertion portion and has a diameter that corresponds to the diameter of the entry aperture structure such that the base engages the entry aperture structure radially. A fastener receiving component is disposed on the shaft. The release tool operates the blocking device and has a corresponding plurality of prongs that are received by the plurality of recesses such that torquing of the tool loosens or tightens the blocking fastener with respect to the fastener receiver.

A blocking device for attaching to a circular aperture structure includes a blocking fastener having a head and a shaft extending from the head, the head having a plurality of cylindrical recesses that extend generally parallel to the shaft from a top surface of the head. A first portion of the shaft is threaded, and a second portion of the shaft extends from the first portion of the shaft and has a smaller diameter than the first portion. A generally circular slot is disposed in the second portion. A fastener receiver has an insertion portion and a base extending generally transversely to the insertion portion, where the insertion portion has a center channel structure with an interior surface that is threaded and is configured to receive the shaft of the blocking fastener. The base has a first tier that extends generally radially from the insertion portion and has a diameter that corresponds to the diameter of the circular aperture structure such that the base engages the aperture structure radially. The base also has a second tier that extends radially from the insertion portion a greater distance than the first portion. The second tier has a clamping surface that engages the entry aperture structure axially. The blocking device also includes a shell having a shell body, where the shell body defines a platform surface that receives a bottom surface of the head, a contact surface generally parallel to the platform surface, and a channel that is configured to receive the insertion portion of the fastener receiver. The channel has a non-cylindrical shape, and the insertion portion has a complementary shape to the channel such that there is no relative rotation of the shell and the fastener receiver with respect to each other. A retaining clip disposed in the slot.

DETAILED DESCRIPTION

Figure 1:
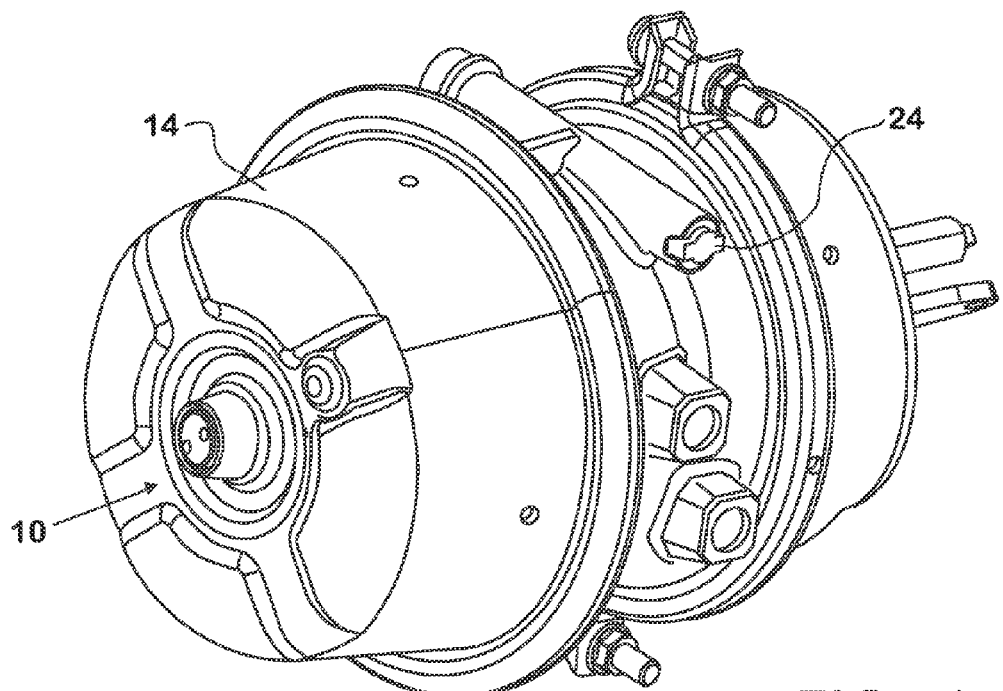
FIG. 1 is a perspective view of a spring brake cylinder having a blocking device installed on an entry aperture of the spring brake cylinder.

Referring to FIGS. 1-8, a blocking device for attachment to an entry aperture 12 of a spring brake cylinder 14 of a vehicle is indicated generally at 10. The blocking device 10 includes a blocking fastener 16, a shell 18, a fastener receiver 20 and a retaining clip 22. These components 16, 18, 20, 22 are assembled together on both an interior side and an exterior side of the entry aperture 12 of the spring brake cylinder 14 to form the blocking device 10. The entry aperture 12 is a generally circular or cylindrical opening in the spring brake cylinder 14.

Unauthorized use of the vehicle can occur if a user inserts a caging bolt 24 through the entry aperture 12 of the spring brake cylinder 14. Thus, when the blocking device 10 is disposed through the entry aperture 12, the blocking device functions as an anti-theft device in that the blocking device prevents the unauthorized entry of the caging bolt 24 into the entry aperture of the spring brakes 14. Further, due to the very large pressure applied by the spring (not shown) inside the spring brake cylinder 14, mechanical release of the spring brake with a caging bolt 24 may be conducted by trained professionals.

Figure 2:
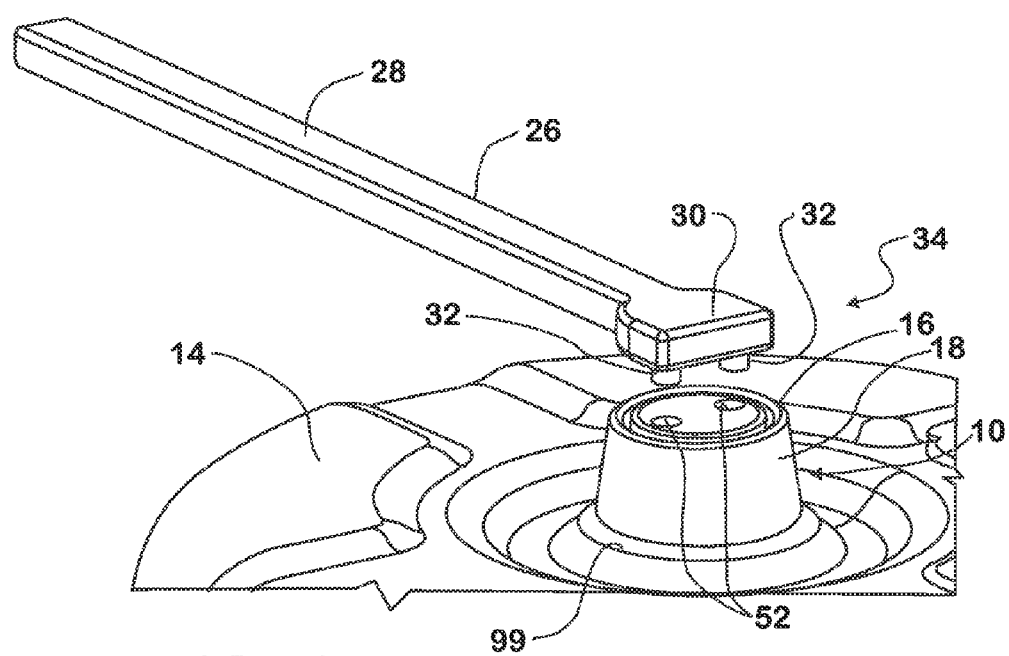
FIG. 2 is a detail perspective view of a release tool used to remove the blocking device from the spring brake cylinder.
Figure 3:
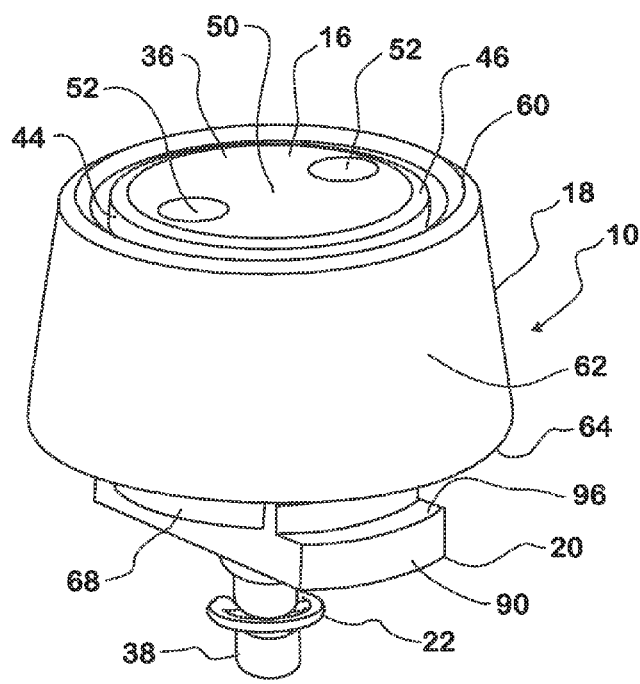
FIG. 3 is a top perspective view of the blocking device.
Figure 4:
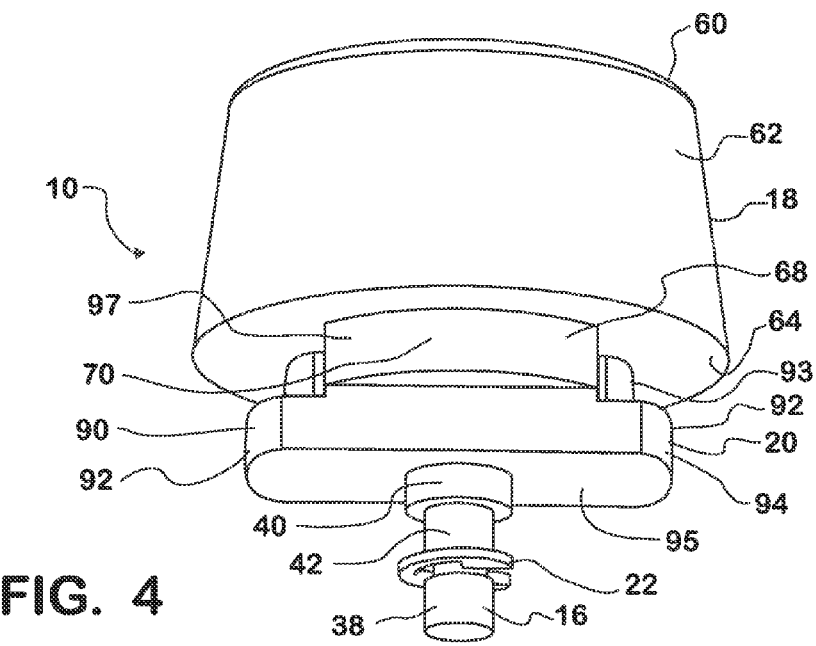
FIG. 4 is a bottom perspective view of the blocking device.
Figure 5:
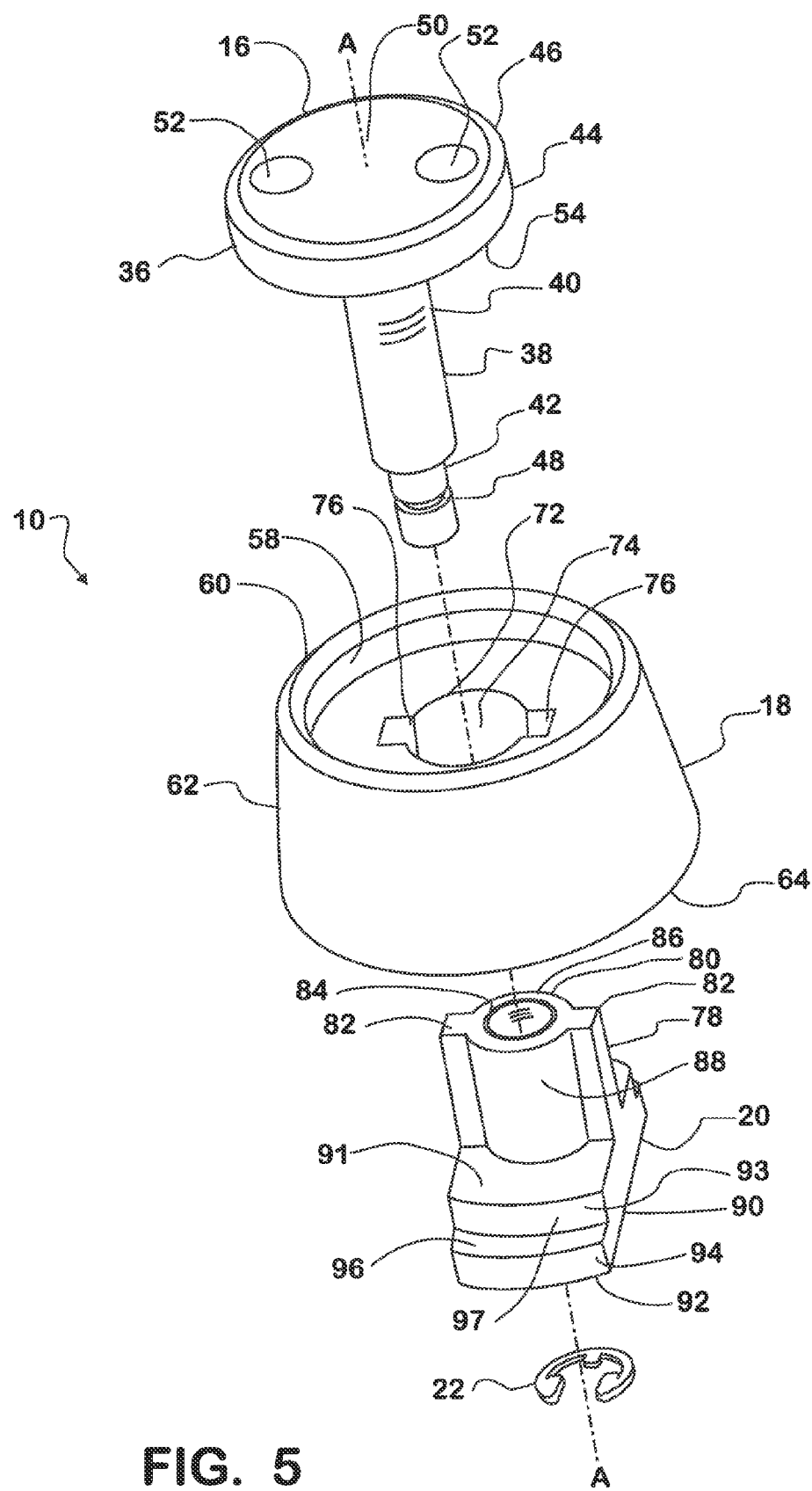
FIG. 5 is an exploded perspective view of the blocking device including a blocking fastener, a shell, a fastener receiver and a retaining clip.
Figure 6:
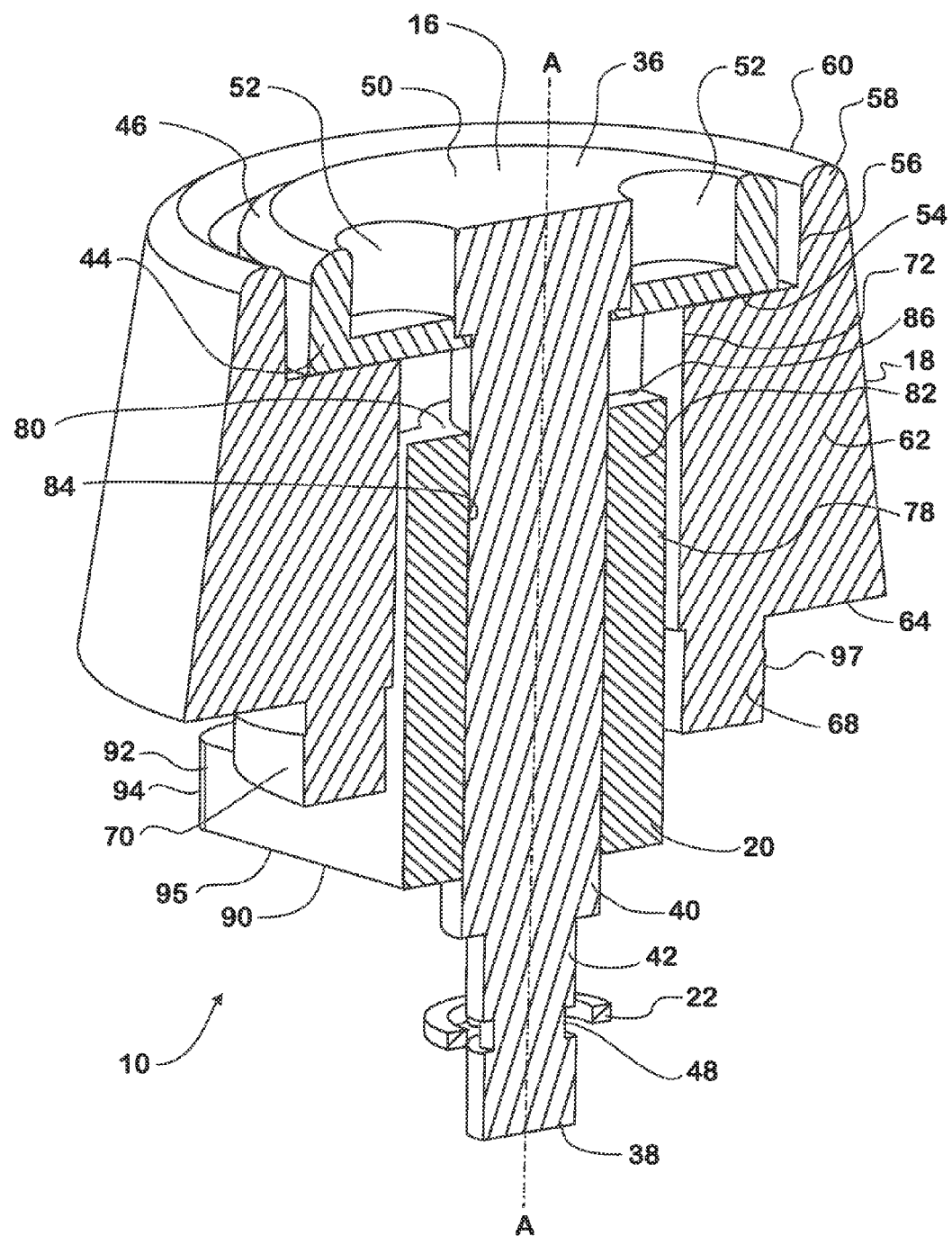
FIG. 6 is a section view of the blocking device.
Figure 7:
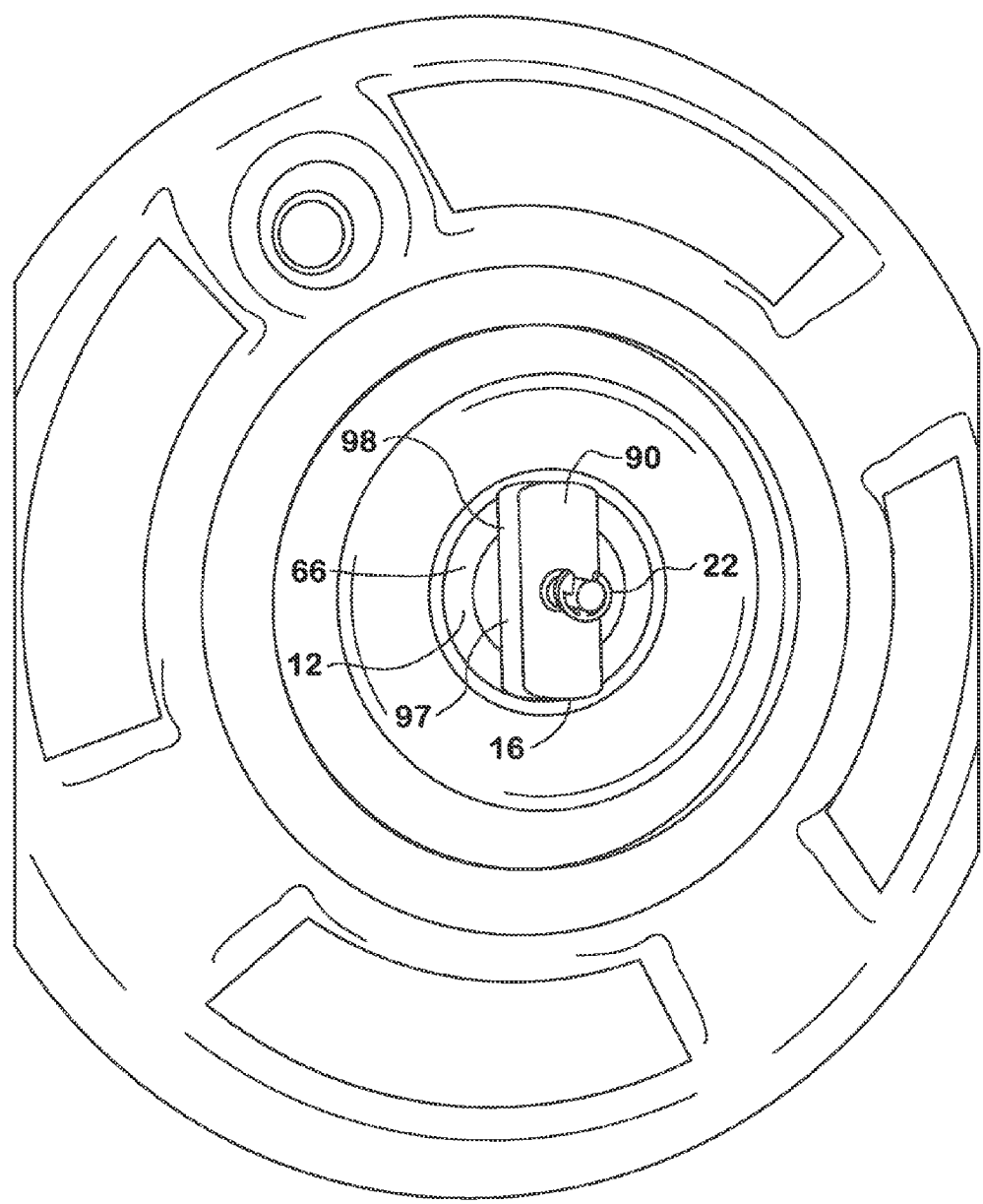
FIG. 7 is a bottom perspective view of the blocking device installed on the spring brake cylinder.

As seen in FIG. 2, a release tool 26 is used to release the blocking device 10 from the spring brake cylinder 14, as will be described in more detail below. It is contemplated that the release tool 26 may only be available to authorized users. The release tool 26 has an elongate handle 28 and a head 30 disposed at one end of the handle. Protruding generally perpendicularly from the head are two prongs 32. Torquing of the tool loosens or tightens the blocking fastener 16 with respect to the fastener receiver 20. Together, the blocking device 10 and the release tool 26 form a blocking system 34 for use by authorized users (see FIG. 2).

The blocking fastener 16 includes a generally flat head 36 and an elongate shaft 38 with a first portion 40 and a second portion 42. At a peripheral surface 44 of the head 36, an edge 46 may be rounded, however other configurations are possible. Extending from the head 36, the first portion 40 of the shaft may be threaded, and the second portion 42 of the shaft may be smooth and extends from the first portion. The second portion 42 may have a smaller diameter than the first portion 40. A slot 48 may be disposed in the second portion 42 for receiving the retaining clip 22. Alternately, some other fastener receiver component may be disposed on the shaft 38, such as a nut.

Disposed on a top surface 50 of the head 36 are two generally cylindrical recesses 52 that extend from the top surface downwardly and generally parallel to the shaft 38. The recesses 52 are generally radially spaced about 180-degrees from each other and are off-center. The release tool 26 has two generally cylindrical prongs 32 of slightly smaller diameter than the recesses 52, such that the prongs are configured to be matingly received in the recesses. It is possible that the recesses 52 in the head 36 can be other shapes than cylindrical, that the number of recesses can vary, and that the location of the recesses can vary. It is also possible that the number, location and shape of the prongs 32 on the release tool 26 can vary. Whatever the configuration of the recesses 52 and the prongs 32, the release tool 26 is configured to engage the recesses with its prongs to rotate the blocking fastener 16 clockwise or counterclockwise about its head 36.

Opposite the top surface 50 of the head 36 is a bottom surface 54 of the head 36, which when the blocking fastener 16 is assembled into the blocking device 10, the bottom surface engages a platform surface 56 of the shell 18. Extending upwardly from the platform surface 56 is a generally cylindrical concealing wall 58, which has a slightly larger diameter than the diameter of the head 36 of the blocking fastener 20. The peripheral surface 44 of the head 36 of the blocking fastener 20 may not contact the concealing wall 58, or alternately, the peripheral surface of the head may contact the concealing wall. Extending from a top surface 60 of the concealing wall 58 is the shell body 62, which may extend generally cylindrically or generally partially conically or radially from the top surface to a contact surface 64. The contact surface 64 of the shell 18 is configured to contact the spring brake cylinder 14 at an aperture structure 66 that defines the entry aperture 12 of the spring brake cylinder. The concealing wall 58 and the shell 18 are configured to complicate a user from being able to grip the blocking fastener 16 at any location other than at the top surface 50 of the head 36.

Extending from the contact surface 64 of the shell 18 may be two skirts 68. The skirts 68 have a side surface 70 that is generally curved such that the two skirts define two segments of a cylinder that are radially spaced center-to-center about 180-degrees.

Extending generally centrally through the shell body 62 is a channel 72 that defines an axis A. The channel 72 extends from the platform surface 56 and may have a center cylindrical channel portion 74 and at least one wing channel portion 76. In the channel 72 of FIG. 5, the channel has two wing portions 76 that are radially spaced about 180-degrees, however other configurations are possible. When viewed axially, the wing portions 76 of the channel 72 may be radially aligned with the centers of the skirts 68, since both of the skirts and the wing portions of the channel may be radially spaced 180-degrees.

The channel 72 receives the fastener receiver 20. The fastener receiver 20 may be generally "T"-shaped. An insertion portion 78 of the fastener receiver 20 is received into the channel 72 in the shell 18, and the insertion portion itself receives the shaft 38 of the blocking fastener 16. The insertion portion 78 includes a center channel structure 80 and may include at least one wing projection 82, or may include two wing projections 82 extending from the center channel structure. The center channel structure 80 has an interior surface 84, which may be generally cylindrical and threaded, that receives the shaft 38 of the blocking fastener 16, which may also be threaded. The center channel structure 80 of the insertion portion 78 has a top surface 86 and an exterior surface 88 that generally circumscribes the interior surface 84, except at the wing projections 82. When the fastener receiver 20 is received in the channel 72 of the shell 18, the exterior surface 88 of the insertion portion 78 may contact the center channel portion 74 of the shell 18, and the wing projections 82 may contact the wing portions 76 of the shell 18. The complementary shape of the channel 72 in the shell 18 and the insertion portion 78 of the fastener receiver 20 prevents the relative rotation of the shell and the fastener receiver with respect to each other in either the clockwise or counterclockwise direction about the axis A.

A base 90 of the fastener receiver 20 is disposed generally transversely to the insertion portion 78 and the axis A. The insertion portion 78 may be centered on the base 90 such that the base extends from the insertion portion radially at about 180-degrees, where the base may be offset from the wing projections 82 radially by about 90-degrees. Two distal ends 92 of the base are generally curved such that the ends define two segments of a cylinder that are radially spaced center-to-center about 180-degrees. The two distal ends 92 may have two tiers, a first tier 93 adjacent the insertion portion and a second tier 94 that forms an exit surface 95 opposite from the insertion portion. The first tier 93 of the base 90 extends radially from the insertion portion 78 and has a diameter that corresponds to the diameter of the aperture structure 66, such that the base engages the aperture structure 66 radially.

Since the interior surface 84 extends through the base 90, the exit surface 95 is the surface in which the shaft 38 of the blocking fastener 16 exits the fastener receiver 20. The second tier 94 extends radially from the axis A a distance greater than the first tier 93. Opposite of the exit surface 95, the second tier 94 of the base 90 has a clamping surface 96 that engages the aperture structure 66 axially. An upper surface 91 of the first tier 93 engages the contact surface 64 of the shell 18.

When the fastener receiver 20 is received in the shell 18, the top surface 86 of the center channel structure 80 does not extend to the bottom surface 54 of the head 36 of the blocking fastener 16, however it is possible that the top surface of the center channel structure can contact the head. Together, the two generally curved distal ends of the first tier 93 of the base of the fastener receiver 20, and the two skirts 68 of the shell 18, form a continuous cylindrical ring that defines an engagement surface 97 for engaging the interior surface of the aperture structure 66 of the spring brake cylinder 14 radially. In other words, the ring engagement surface 97 formed by the two skirts 68 and the distal ends of the first tier 93 form a plug into the aperture structure 66 that defines the generally circular entry aperture 12 of the spring brake cylinder 14.

When assembled, the first portion 40 of the shaft extends through the exit surface 95 of the base 90. The second portion 42 with reduced diameter extends from the first portion 40 and may not contact any other component of the blocking device 10. The retaining clip 22 is disposed in the slot 48, which is an axial distance from the exit surface 95 of the base. The length of the shaft 38 of the blocking fastener 16 and the location of the retaining clip 22 on the second portion 42 of the shaft, allows the blocking fastener 16 to be withdrawn an axial distance, but does not allow the complete withdrawal of the blocking fastener from the shell 18. In other words, the location of the retaining clip 22 allows some play in the assembly of the blocking device 10 when the blocking fastener 16 is partially withdrawn, but does not allow the complete disassembly of the blocking device.

The blocking device 10 may be assembled together prior to assembly onto the spring brake cylinder 14. With the blocking fastener 16 in a loosened position (i.e. displaced outwardly with respect to the fastener receiver 20), the blocking fastener, the shell 18, the fastener receiver 20 and the retaining clip 22 are assembled but are not a tightened assembly. In the loosened state, the base 90 of the fastener receiver and the second portion 42 of the shaft 38 with the retaining clip 22 are maneuvered through the entry aperture 12 due to the play in the assembly along the length of the shaft 38. Through tightening of the blocking fastener 16, for example with the release tool 26, the clamping surface 96 of the second tier 94 of the base 90 clamps the aperture structure 66 at an interior surface 98 of the spring brake cylinder 14 (see FIG. 7), and the contact surface of the shell 18 clamps the aperture structure from an exterior surface of the spring brake cylinder (See FIG. 2). Together, the distal ends 92 of the first tier 93 and the skirts 68 of the shell 18 form the ring engagement surface 97 that is configured to abut the aperture structure 66 around the periphery of the entry aperture 12 of the spring brake cylinder 14.

When the blocking device 10 is installed in the spring brake cylinder 14, there is no access to the retaining clip 22 and the retaining clip may not be removed from the shaft 38. As the blocking fastener 10 is loosened by rotation about the axis A using the release tool 26, the retaining clip 22 prevents the blocking fastener 16 from being completely removed, which in turn, prevents the fastener receiver 20 from falling into the spring brake cylinder 14. Once the blocking fastener 16 is loosened, the assembly of the blocking fastener, the shell 18, the fastener receiver 20 and the retaining clip 22 can be maneuvered out of the entry aperture 23 of the spring brake cylinder chamber 14 while still remaining an assembly of parts that is held together. Specifically, the still intact blocking device 10 can be maneuvered from the interior of the spring brake chamber 14 to the exterior of the spring brake chamber through the entry aperture 12 due to the length of the shaft 38 relative to the shell 18 and the fastener receiver 20, and the positioning of the retaining clip 22. With this configuration, the likelihood of individual parts being lost upon removal of the blocking device 10, as well as the likelihood of dropping components inside the spring brake chamber 14 upon removal of the blocking device 10, may be reduced.

Figure 8:
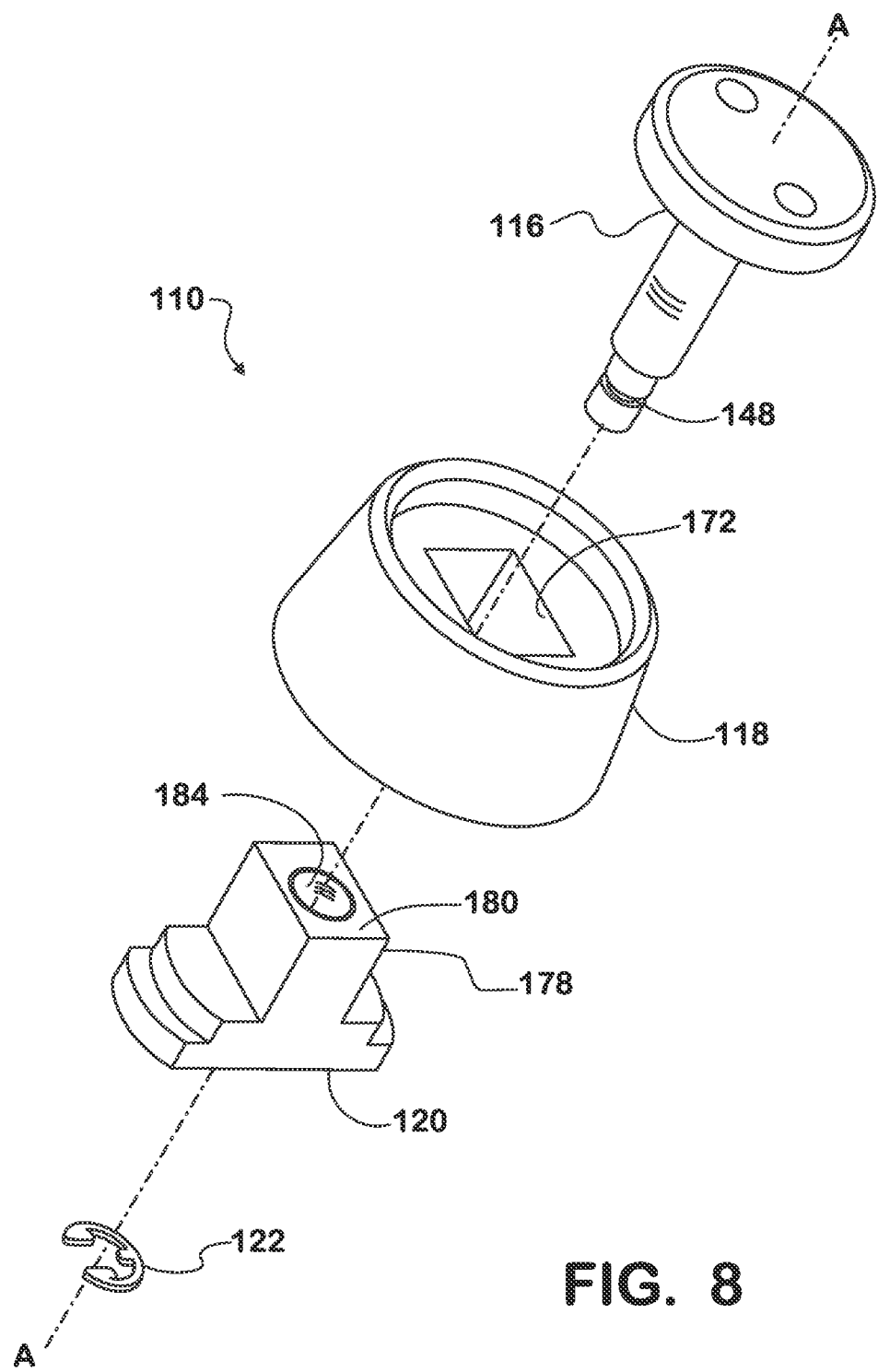
FIG. 8 is an exploded perspective view of a second embodiment of blocking device.

Referring now to FIG. 8, a second embodiment of blocking device is indicated generally at 110, and is generally similar to the blocking device 10 with exception to the configuration of the channel of the shell 118, and the configuration of the insertion portion of the fastener receiver 120. The channel 172 of the shell 118 is generally rectangular prismatic, and the corresponding shape of the insertion portion 178 is also generally rectangular prismatic and has slightly smaller dimensions such that the insertion portion can be received in the channel. With the rectangular geometry of the channel 172 of the shell 118 and the insertion portion 178 of the fastener receiver 120, the relative rotation of the fastener receiver 120 relative to the shell 118 about the axis A is prevented. Similar to the blocking device 10, the center channel structure 180 of the insertion portion 178 has an interior threaded surface 184 for receiving the blocking fastener 116. The retaining clip 122 is received in the slot 148 of the blocking fastener 116.

The retaining clip 22, 122 may be an "E"-type clip, however other types of retaining clips are possible. All of the components of the blocking device 10, 110 may be formed of steel, however other materials are possible.

With the blocking device 10, 110, unauthorized use of the vehicle can be deterred. It is contemplated that the release tool 26 that is operable with the blocking device 10, 110 may only be available to authorized users.

While the blocking device 10, 110 was explained with reference to use on a spring brake cylinder 14, it should be appreciated that the blocking device can be used in any vehicle or application where an entry aperture or other opening is to be protected from unauthorized entry.

What is claimed is:

1. A blocking device for attaching to an entry aperture structure of a spring brake cylinder of a vehicle, the blocking device comprising:
   a blocking fastener having a head and a shaft extending from the head, the head having a plurality of cylindrical recesses that extend generally parallel to the shaft, wherein at least a portion of the shaft is threaded;
   a fastener receiver having an insertion portion and a base extending generally transversely to the insertion portion, wherein the insertion portion has an interior surface that is threaded and is configured to receive the shaft of the blocking fastener, and the base has a first tier that extends generally radially from the insertion portion and has a diameter that corresponds to the diameter of the entry aperture structure such that the base engages the entry aperture structure radially; and
   a fastener receiving component disposed on the shaft.

2. The blocking device of claim 1 further comprising a shell having a shell body, wherein the shell body defines a platform surface that receives a bottom surface of the head, and a channel that is configured to receive the insertion portion of the fastener receiver.

3. The blocking device of claim 2 wherein the channel has a non-cylindrical shape, and wherein the insertion portion has a complementary shape to the channel such that there is no relative rotation of the shell and the fastener receiver with respect to each other.

4. The blocking device of claim 3 wherein the channel further comprises a generally cylindrical center channel portion and two wing channel portions extending from the center channel portion, and wherein the insertion portion further comprises a generally cylindrical center channel structure and two wing projections extending from the center channel structure.

5. The blocking device of claim 2 wherein the shell further comprises a generally cylindrical concealing wall that extends from the platform surface to generally circumscribe the head of the blocking fastener.

6. The blocking device of claim 2 wherein the shell body is generally cylindrical or partially conical, and includes a contact surface that is generally transverse to the channel and is configured to contact the spring brake cylinder.

7. The blocking device of claim 6 wherein the shell further comprises two skirts that extend from the contact surface, and together with the first tier of the base of the fastener receiver, both the skirt and the first tier engage the entry aperture structure radially to plug the entry aperture.

8. The blocking device of claim 1 wherein the base has a second tier that extends radially from the insertion portion a greater distance than the first portion, and the second tier has a clamping surface that engages the entry aperture structure axially.

9. The blocking device of claim 1 further comprising a generally circular slot disposed in the shaft of the blocking fastener, and a retaining clip disposed in the slot.

10. A blocking system for blocking an aperture of a vehicle component, the blocking system comprising:
   a blocking device, comprising:
      a blocking fastener having a head and a shaft extending from the head, the head having a plurality of recesses that extend generally parallel to the shaft, wherein at least a portion of the shaft is threaded;
      a fastener receiver having an insertion portion and a base extending generally transversely to the insertion portion, wherein the insertion portion has an interior surface that is threaded and is configured to receive the shaft of the blocking fastener, and the base has a first tier that extends generally radially from the insertion portion and has a diameter that corresponds to the diameter of the entry aperture structure such that the base engages the entry aperture structure radially;
      a fastener receiving component disposed on the shaft; and
   a release tool to operate the blocking device, the release tool having a corresponding plurality of prongs that are received by the plurality of recesses such that torquing of the tool loosens or tightens the blocking fastener with respect to the fastener receiver.

11. The blocking system of claim 10 wherein the blocking device further comprises a shell having a shell body, wherein the shell body defines a platform surface that receives a bottom surface of the head, and a channel that is configured to receive the insertion portion of the fastener receiver.

12. The blocking system of claim 10 wherein the release tool has a generally elongate handle and a head at the end of the handle, wherein the prongs extend generally perpendicularly from the head.

13. A blocking device for attaching to a circular aperture structure, the blocking device comprising:
   a blocking fastener having a head and a shaft extending from the head, the head having a plurality of cylindrical recesses that extend generally parallel to the shaft from a top surface of the head, wherein a first portion of the shaft is threaded, and a second portion of the shaft extends from the first portion of the shaft and has a smaller diameter than the first portion, wherein a generally circular slot is disposed in the second portion;
   a fastener receiver having an insertion portion and a base extending generally transversely to the insertion portion, wherein the insertion portion has a center channel structure with an interior surface that is threaded and is configured to receive the shaft of the blocking fastener, and the base has a first tier that extends generally radially from the insertion portion and has a diameter that corresponds to the diameter of the circular aperture structure such that the base engages the aperture structure radially, the base having a second tier that extends radially from the insertion portion a greater distance than the first portion, the second tier having a clamping surface that engages the entry aperture structure axially;
   a shell having a shell body, wherein the shell body defines a platform surface that receives a bottom surface of the head, a contact surface generally parallel to the platform surface, and a channel that is configured to receive the insertion portion of the fastener receiver, wherein the channel has a non-cylindrical shape, and wherein the insertion portion has a complementary shape to the channel such that there is no relative rotation of the shell and the fastener receiver with respect to each other; and
   a retaining clip disposed in the slot.

14. The blocking device of claim 13 wherein the shell further comprises two skirts that extend from the contact surface, and together with the first tier of the base of the fastener receiver, both the skirt and the first tier engage the entry aperture structure radially to plug the entry aperture.

15. The blocking device of claim 13 wherein the channel further comprises a generally cylindrical center channel portion and two wing channel portions extending from the center channel portion, and wherein the insertion portion further comprises a generally cylindrical center channel structure and two wing projections extending from the center channel structure.

* * * * *